Dec. 10, 1946. R. G. SMITH Re 22,817
TURN-TILT UNLOADING TOY RAILWAY CAR
Original Filed May 28, 1940 3 Sheets-Sheet 1
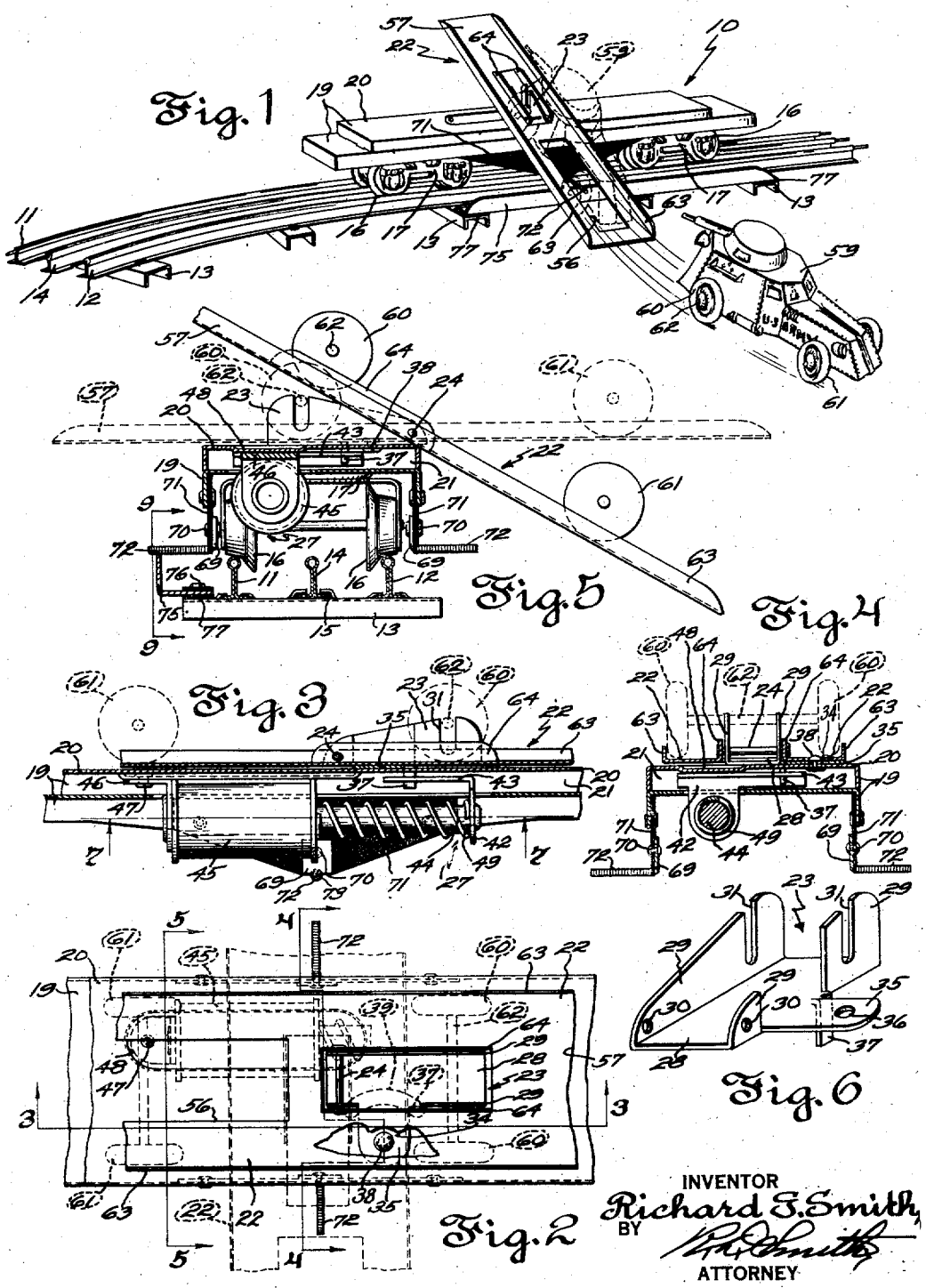
INVENTOR
Richard G. Smith
BY
ATTORNEY Dec. 10, 1946. R. G. SMITH Re 22,817

TURN-TILT UNLOADING TOY RAILWAY CAR

Original Filed May 28, 1940 3 Sheets-Sheet 2

INVENTOR
Richard G. Smith,
BY
ATTORNEY

Dec. 10, 1946. R. G. SMITH Re 22,817

TURN-TILT UNLOADING TOY RAILWAY CAR

Original Filed May 28, 1940 3 Sheets-Sheet 3

INVENTOR
Richard G. Smith,
BY
ATTORNEY

Reissued Dec. 10, 1946

Re. 22,817

UNITED STATES PATENT OFFICE 22,817

TURN-TILT UNLOADING TOY RAILWAY CAR

Richard G. Smith, Amsterdam, N. Y.

Original No. 2,373,148, dated April 10, 1945, Serial No. 337,625, May 28, 1940. Application for reissue August 14, 1946, Serial No. 690,400

29 Claims. (Cl. 104—150)

This invention relates to toy railway cars and to appurtenances associated with both the car and the track on which it runs for carrying and delivering a toy freight load and particularly load objects capable of rolling, and still more particularly a load object in the form of a toy wheeled vehicle or toy automobile.

The appeal of toy railway set construction and operation as a hobby or as a mere plaything lies in the effectiveness and variety of ways in which the performance of toy parts can be made to simulate actual full size railroad operation. Yet for toy purposes the parts must be sufficiently simple in construction and low in cost to make possible a large quantity production that will reduce consumer price. The present improvements meet these objectives as to a toy freight handling railway car which is featured by realistic performance in automatically transporting and unloading therefrom a toy wheeled vehicle or other load object.

One object of the invention is to provide a toy railway flat car for carrying a toy automobile and which is equipped with means to constrain the toy automobile against rolling on its own wheels atop the flatcar as well as against lateral displacement on such car as the latter starts or stops or swerves in rounding curves in the track.

A further object is to equip the car with mechanism which will unload the toy automobile from the car by discharging it therefrom to a position beside the track and this, if desired, while the car remains coupled at both of its ends to adjoining cars in the toy train.

A further object is to discharge the toy automobile or other toy freight load from the car in two stages of unloading action, the first stage consisting of swinging the toy automobile about and away from its normal lengthwise alignment with the railway car and into a position in which the length of the toy load vehicle extends crosswise of and overhangs the railway car, and the second stage consisting in tilting the load vehicle in such manner that it will roll off and down from the railway car preferably but not necessarily by the force of gravity alone.

A further object is to provide mechanism for the foregoing purpose whose parts will automatically restore themselves to their normal load carrying positions after having acted as described to discharge the toy load.

A further object is to equip the unloading car with electrically actuated means for automatically upon occasion discharging the toy load vehicle from the toy railway car through trackside sources of current supply from which electrical energy may be picked up by the railway car as the latter passes predetermined points along the track.

A further object is to provide electrical control means whereby the unloading mechanism carried by the railway car may be caused to perform its unloading function independently of the electric track circuit which supplies current for running the train, so that unloading action can take place either while the railway car is running along its track or when the car stands stationary on the track.

Ample examples of ways and means for attaining the foregoing and other objects will become clear from the following description, in which description reference is had to the accompanying drawings, wherein:

Fig. 1 is a perspective view of a section of toy railway track with an unloading car illustrative of the present invention standing thereon detached from its train and shown in the act of discharging a toy load vehicle.

Fig. 2 is a plan view of a portion of the length of the railway car in Fig. 1 showing an elongated turn-tilt table for supporting and discharging a load having its longest dimension normally disposed lengthwise of the car.

Fig. 3 is a view taken in section on the plane 3—3 in Fig. 2 looking in the direction of the arrows.

Fig. 4 is a view taken in section on the planes 4—4 in Fig. 2 looking in the direction of the arrows.

Fig. 5 is a view taken in section on the plane 5—5 in Fig. 2 looking in the direction of the arrows and showing the turn-tilt table shifted to load discharging positions crosswise of the car and also showing the track structure.

Fig. 6 is a perspective view drawn on an enlarged scale showing the swiveling fulcrum bracket detached from the other parts.

Figure 7:
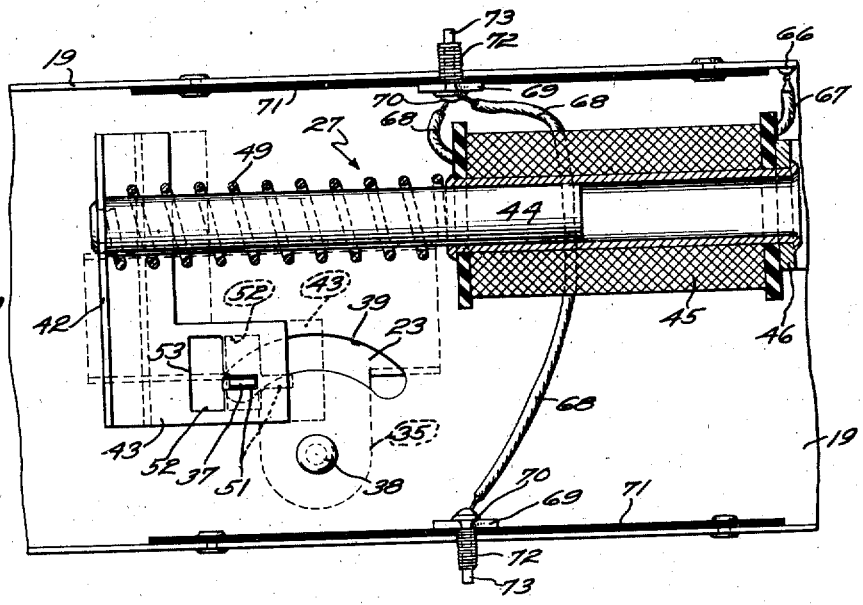
Fig. 7 is a fragmentary view drawn on an enlarged scale looking upward at the bottom of the car platform and showing certain parts in section on the plane 7—7 in Fig. 3, the fulcrum bracket being positioned to dispose the length of the turn-tilt table lengthwise of the car platform.

The toy railway car embodying the present improvements is indicated as a whole by 10 in Fig. 1. Whereas for simplicity its coupling parts or draft gear and the adjoining cars of its train are not shown it will be understood that such may be of conventional form, the wheels of the cars and locomotive of the train riding on the two outside or traction rails 11 and 12 which are supported by, and may be in electrical contact with, the sleepers 13 as usual. The middle or "third" or power rail 14 supplies electric current to be picked up by the trolley or collector shoe of the toy locomotive and hence is insulated from the sleepers 13 and from traction rails 11 and 12 in any suitable manner as at 15.

Car 10 rolls on its usual form of toy traction wheels 16 whose axles support spaced trucks 17. The flat platform 19 of the car chassis rests pivotally on each of the trucks 17 in usual manner and as illustrated herein includes a top deck 20 which affords therebelow a shallow space 21 occupied by certain parts of the unloading mechanism.

The unloading mechanism consists mainly of three principal units including an elongated runway type of turn-tilt table 22 hinged on a fulcrum base, here shown in the form of bracket 23, by means of the pivot pin 24. This fulcrum bracket rests on top of the deck 20 of the platform 19 and swivels in relation thereto. The third main unit of the unloading mechanism comprises electromagnetic actuating means located under the car and designated as a whole by 27.

Full details of the U-shaped fulcrum bracket 23 are best shown in Fig. 6 where it is seen to consist of a bed wall 28 from either side of which upstands the spaced and tapering head walls 29 containing in their low ends the holes 30 for pivot pin 24 affording a pivot bearing and in their high ends the detent notches 31 opening upward. A part of one head wall 29 is diverted horizontally to form a flat continuation of the bed wall 28 thereby affording a lug 35 containing the pivot hole 36 offset considerably from the longitudinal center line of the bracket. Another part of the head wall section of the bracket is turned downward instead of upward to form the tongue 37 by means of which the fulcrum bracket 23 is actuated.

Figure 8:
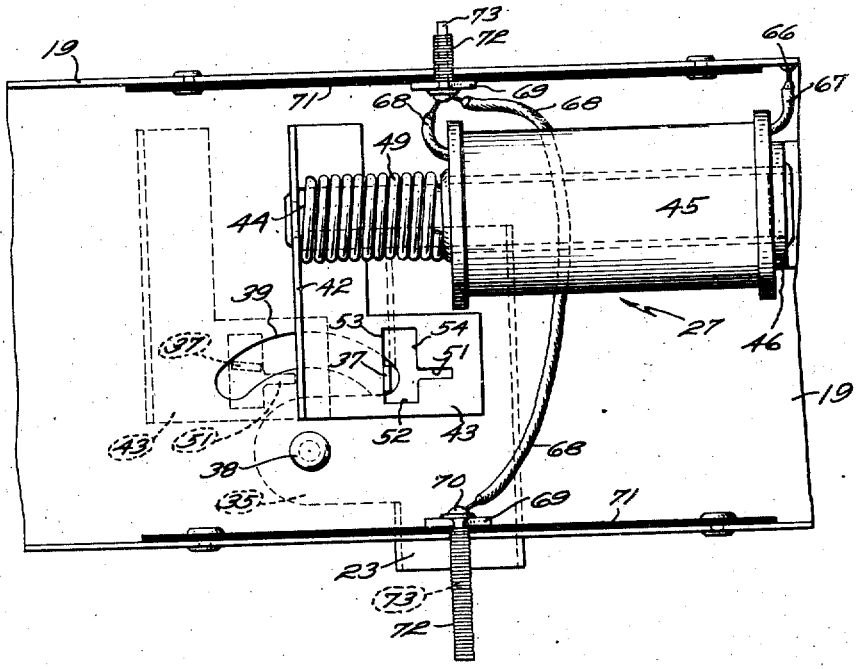
Fig. 8 is a view similar to Fig. 7 showing the fulcrum bracket swung a quarter turn to position the turn-tilt table as in Figs. 1 and 5.
Figure 9:
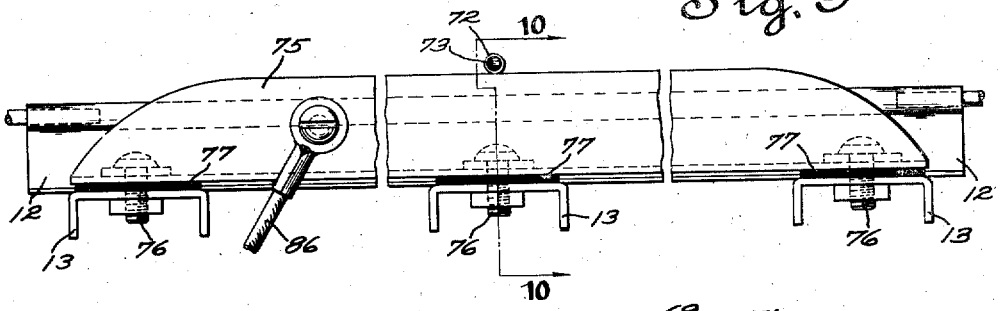
Fig. 9 is an enlarged view of the fourth rail and associated track structure looking from the left at Fig. 5 from the section plane 9—9.
Figure 10:
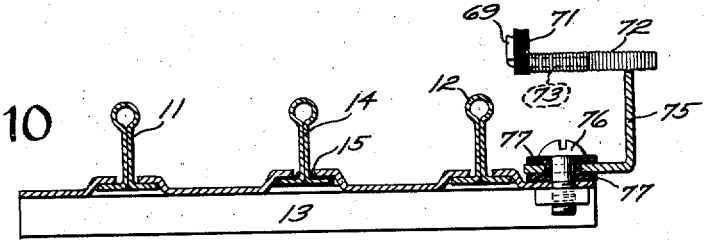
Fig. 10 is a view taken in section on the plane 10—10 in Fig. 9 looking in the direction of the arrows.

As best shown in Figs. 2, 7 and 8, the lug 35 of fulcrum bracket 23 is connected by a pivot stud 38 to the deck 20 of car platform 19 in a manner permitting the fulcrum bracket to swivel freely from its normal position shown in Figs. 2, 3, 4 and 7 to its unloading position crosswise of the car shown in Figs. 5 and 8, and by broken lines in Fig. 2. This swiveling movement of the fulcrum bracket is limited to 90 degrees of swing by the engagement of the actuating tongue 37 of bracket 23 with stop means herein afforded by opposite ends of an arcuate slot 39 in the deck 20 of the car platform, through which slot tongue 37 extends downward to be engaged by the cam-like apertured plate 43 within the shallow deck space 21. Cam or plate 43 has a flange 42 fixed rigidly on and carried by the extreme end of a magnet plunger 44 which as best shown in Fig. 7 is slidable into and out of the magnet solenoid 45 of usual construction and thus serves as an electromagnetically operated actuator. This solenoid is rigidly mounted against the under surface of the platform deck 20 by means of one or more angle brackets 46 whose fastening rivets 47 are prevented from projecting above the top surface of deck 20 because occupying a slightly sunken or depressed panel space 48. A coiled spring 49 loosely surrounds plunger 44 and constantly exerts a thrust tending to withdraw the plunger from the solenoid toward its position shown in Figs. 3 and 7. When electrically energized, the strength of pull of the solenoid upon the plunger overcomes the expansive tension in spring 49 and draws magnet plunger 44 inward thus shifting its carried cam plate 43 to the position shown in Fig. 8. Pivotal bearing pin 24 forms part of what I may appropriately term a hinge joint while pivot stud 38 may be regarded as forming part of a swivel joint.

In the cooperative action of cam plate 43 and tongue 37 it will be understood that the cam plate moves in a straight path of travel while the tongue must move in an arcuate path. In the normal relationship of this tongue and cam plate shown in Fig. 7, the tongue 37 occupies a notch 51 forming a branch of the main aperture 52 in the cam plate. Starting with the relationship of parts shown in full lines in Fig. 7, it will be seen that the fulcrum bracket 23 is locked against movement because tongue 37 is lodged in notch 51 until the cam plate 43 has completed a preliminary movement toward the right. Until this has occurred no movement of tongue 37 (in a direction toward the plunger 44 as required by the tongue's arcuate path of travel) can take place. Nevertheless the lodging of tongue 37 within notch 51 in no way restrains cam plate 43 from moving toward the right when the solenoid 45 is electrically energized. The beginning of the cam plate movement toward the right will shift the cam plate aperture 52 and its branch notch 51 into the broken line position indicated in Fig. 7. At this point tongue 37 has become freed from notch 51 so that continued movement of cam plate 43 toward the right results in the left edge 53 of aperture 52 picking up and impelling tongue 37 to the full line position of parts shown in Fig. 8.

In the reverse movement of the cam plate from right to left in Fig. 8, the first portion of the corresponding travel of aperture 52 constitutes lost motion relative to tongue 37, but thereafter the right edge 54 of aperture 52 picks up and impels tongue 37 ahead of it toward the left, this tongue gradually swinging counterclockwise in Fig. 8 to its broken line position in the latter figure wherein the edge of tongue 37 is nearly disposed to be received again into the notch 52 which again will then cause the tongue to become locked against movement other than by subsequent actuation through plunger 34, as represented by full lines in Fig. 7.

In the position of fulcrum bracket 23 as shown in Figs. 1, 5, 8 and by broken lines in Fig. 2, the pivot pin 24 is swung to a position best shown in Fig. 5 which is nearly at the side edge of the platform deck 20 of the car so that the right end of the turn-tilt table 22, which in Figs. 3, 4 and 7 rests upon and is prevented from tilting downward by the platform deck 20, now overhangs and is free from restraint by the platform edge when in its broken line position in Fig. 5 so that it may tilt downward to its full line position shown in Fig. 5. In the absence of a load thereon, table 22 will not tilt downward away from its horizontal position because the load delivering end of the table contains a large aperture 56 which so much reduces the weight of this end of the table that the other end 57 at the opposite side of pivot pin 24 is the heavier. This preponderance of weight of the table end 57 is normally supported by the platform deck 20 causing the table to maintain its broken line position in Fig. 5. But if a heavy enough load is carried by the table 22 in such manner that the center of gravity of the load falls on the load delivering side of pivot 26, a turning moment may thereby be set up causing the table to tilt clockwise into its full line position in Fig. 5 because the preponderance of weight is then on the load delivering end of the table. An inclined chute is thus provided by the tilted table off from which the load may slide or roll.

In Fig. 1 the load object is indicated to consist of a toy wheeled vehicle 59 having two rear wheels, as 60, and two front wheels, as 61. The rear wheels in the usual manner of a toy vehicle are connected by an axle 62 which may be lodged loosely and removably within the detent notches 31 of the fulcrum bracket 23. This so positions the toy load vehicle on the turn-tilt table 22 that the center of gravity of the latter falls on the load delivering end of the table which contains aperture 56 so that this end of the table plus its share of the load becomes heavier than the opposite end 57 of the table plus its share of the load, if any, with respect to the fulcrum pivot 24. Hence, the described dispositioning of the weight of the load vehicle can cause the table 22 to tilt from its broken line position in Fig. 5 to its full line position in Fig. 5 by gravity effect alone, whereupon the vehicle axle 62 is swung upward out of and free from the detent notches 31 enabling the vehicle to roll down and off from the table. To provide guide rails or gangway tracks to direct the load vehicle lengthwise of the table 20, the latter is formed into a runway by upturned edge flanges 63 and with similarly upturned inner flanges 64 which receive the fulcrum pivot pin 24 and provide a smooth bearing thrust against the sides of fulcrum bracket 23. These flanges make of the turn-tilt table 22 a chute-like load receptacle or dump body which is connected to the car chassis by the swivel joint at 38 and by the hinge joint at 24.

A conductive circuit by which solenoid 45 is furnished with electric current for pulling plunger 44 from its position in Fig. 7 to its position in Fig. 8 includes the grounding of one end of the solenoid winding to the metallic car platform at 66 by means of the lead 67, while the other end of the same solenoid winding terminates in a lead wire 68 which is soldered or conductively secured otherwise to a metallic anchor member 69 on each side of the car. Member 69 is fixed by a rivet 70 to the stiff side plate 71 made of insulative material. One end of a fine close wound coil 72 of springy electrical conductive wire fits tightly over the laterally extending finger 73 of each anchor member and is securely held thereby thus forming a very flexible "cat's whisker" the outer free end of which constitutes a current collector shoe capable of riding yieldingly and lightly into engagement with the top edge of a fourth rail 75. The latter comprises an angle strip spanning and held fixedly on the top of the ends of two or more of the track sleepers 13 by rivets 76 and is insulated therefrom by separators 77.

Figure 11:
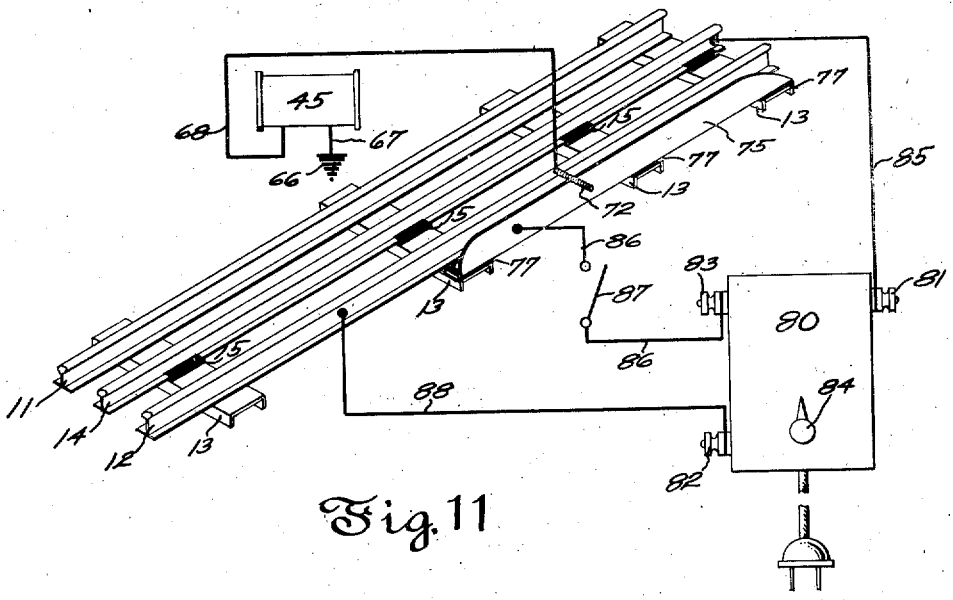
Fig. 11 is a diagram of electric circuits for supplying current to propel the train and independently to operate the unloading mechanism.

A desirable arrangement of circuit connections and control instrumentalities for operating this improved toy is shown in Fig. 11 wherein 80 represents a variable transformer capable of stepping down a home current supply line of 110 volts to a toy output range of, say, 7½ to 15 volts. In the transformer here indicated a potential of 15 volts may be constantly delivered across binding post 83 and 82 while the potential across binding posts 82 and 81 can be modulated between 7½ volts and 15 volts by turning the voltage regulating knob 84. A line 85 connects binding post 81 with the "third" rail 14 of the track from which driving power is derived by the electric locomotive of the toy train. A line 86 connects binding post 83 with the "fourth" rail 75, and this line is interruptible by a manually operable switch 87. A line 88 connects binding post 82 with either or both of the traction rails 11 or 12.

In operation a train containing the unloading car 10 may be run over the tracks of any desired toy railway lay-out at speeds determined by the voltage regulating knob 84 of the transformer 80 which will vary the potential between transformer terminals 81—82 and thereby between rails 12 and 14 without of necessity changing the potential of 15 volts always available to rails 14 and 75 from transformer terminals 83—82 through the manual switch 87. The car 10, whose chassis including platform 19 carries the vehicle 59 positioned thereon as in Fig. 3, may be unloaded by the action indicated in Fig. 1 when its current pick-up shoe, or "cat's whisker" 72, is in contact with fourth rail 75 if switch 87 then be closed. This will establish a 15 volt circuit, traceable from 83 through 86, 87, 72, 68, the car carried solenoid 45, 67 and then the car platform, truck and wheels to traction rail 12 and thence back to the transformer terminal 82 through the lead 88. Upon thus being electrically energized, solenoid 45 draws into itself the magnetic plunger 44 which by movement from its position in Fig. 7 to its position in Fig. 8 causes the cam plate 43 to swing the fulcrum bracket 23 and with it the turn-tilt table 22 a quarter turn from positions shown in Figs. 2, 3, 4 and 7 to positions shown in Figs. 5 and 8. Thereupon the weight of the toy load vehicle 59 becomes offset with respect to the edge of the car and tilts table 22 from its broken line position in Fig. 5 to its full line position in Figs. 1 and 5, whereupon the load vehicle rolls down and off from the turn-tilt table at the side of the track. Upon being relieved of the weight of the load vehicle, the heavier end 57 of the turn-tilt table restores the latter to its broken line position in Fig. 5 whereupon if solenoid 45 is deenergized spring 49 acts through cam plate 43 to swing the table 22 back into longitudinal alignment with the platform of the railway car as shown in Figs. 2, 3 and 4 ready to receive, transport and later discharge another toy load when placed thereon.

As a current pick-up shoe such as 72 is provided at both sides of the car, the fourth rail 75 may be placed on either side of the track. This and many other modifications are possible and will be suggested by the teachings of this disclosure, it being understood that load objects other than a wheeled vehicle and whether capable or incapable of rolling may be discharged from a turn-tilt table by such means as are herein provided so long as their weight can be swung about to a position sufficiently overhanging the edge of the car with respect to the fulcrum pivot 24. Where this is not the case, means for forcibly causing the turn-tilt table to assume its inclined position may be provided if desired. The car deck 20 is representative of any platform with respect to which the movable parts may function as herein taught.

Certain of the features of the invention described in the foregoing are claimed in my copending divisional applications, Serial No. 461,947, filed October 14, 1942, and Serial No. 492,433, filed June 26, 1943.

The folowing claims are directed to and are intended to cover all substitutes and equivalents of the parts which are herein shown merely to illustrate the principles of the invention.

I claim:

1. A toy railway car for transporting along a toy track a toy load vehicle having wheels and a wheel axle and for discharging said vehicle at the side of the track, including the combination of, a car chassis a fulcrum bracket swiveled on said chassis for turning relatively thereto about a vertical axis, and an elongated table carried by said chassis adapted to support said toy wheeled vehicle with its wheel axle extending crosswise of the car, said platform being pivotally connected to said fulcrum bracket for tilting about a horizontal axis relative to both said bracket and said chassis thereby to cause said vehicle to roll off from said car at the side of the track, and said fulcrum bracket being constructed and arranged releasably to engage and hold said wheel axle of the toy vehicle in a manner to prevent the latter from rolling along said table on its own wheels except when said table is in tilted position relative to said bracket and chassis.

2. Mechanism for unloading a toy wheeled vehicle including in combination with a platform terminating at an edge elevated above its surroundings, a fulcrum bracket swiveled on said platform to be turnable relative thereto about a vertical axis located near said edge of the platform, an elongated table adapted to serve as a temporary rest for the toy vehicle when placed thereon in a position to roll lengthwise thereof, detent means to prevent rolling of said vehicle along said table, and a fulcrum joint connecting said bracket and table so that said table swings with said bracket between a position in which the vehicle delivering end portion of the table overlies and rests on said platform to a position in which said table end portion overhangs said edge of the platform, whereby said table end portion is deprived of support by said platform and the weight of the toy vehicle resting upon said table end portion can cause said table automatically to tilt on said fulcrum joint relatively to said fulcrum bracket to an inclined position in which position said vehicle will roll down and off from said table when released from said detent means.

3. Mechanism for unloading a toy wheeled vehicle as defined in claim 2, in which the said detent means is carried by the said fulcrum bracket and is so operatively disposed that the tilting of the said table relative to said fulcrum bracket releases the said toy wheeled vehicle from said detent means.

4. Mechanism for unloading a toy wheeled vehicle as defined in claim 2, in which the said detent means is carried by the said fulcrum bracket and is constructed and arranged to engage said vehicle restrainingly while the center of gravity of the latter rests on the said vehicle discharging end portion of the said table and in such manner as to permit the tilting of said table to lift the detent engaged portion of said vehicle to a position free from restraining engagement by said detent means.

5. Mechanism for unloading a toy wheeled vehicle as defined in claim 2, in which the said detent means is carried by the said fulcrum bracket and is constructed and arranged restrainingly to engage a relatively light portion of the length of said vehicle which rests on one side of the said fulcrum joint while a relatively heavier portion of the length of said vehicle rests on the said vehicle discharging end portion of said table on the opposite side of said fulcrum joint, the engagement between said detent means and said lighter vehicle portion enabling the said tilting of the said table to be caused by the distribution of weight of said vehicle with respect to said fulcrum bracket and to lift said lighter vehicle portion to a position free from restraint by said detent means.

6. A toy railway car for transporting and discharging therefrom a toy wheeled load vehicle, including the combination of, a car body having a bare platform, a fulcrum bracket pivotally mounted on said platform and having a horizontally elongated head upstanding from said platform containing a detent notch near one end thereof, a pivot bearing supported on said bracket head near the other end thereof, an elongated runway table fulcrumed on said pivot bearing atop said car platform and supported by the latter against tilting about said bearing, said table extending past said pivot bearing in both directions and straddling and flanking said fulcrum bracket in a manner to support two of the wheels of a toy vehicle in positions spaced from said bearing in one direction and to support the remaining wheels of said vehicle in positions spaced from said bearing in the opposite direction.

7. A toy railway car as defined in claim 6, in which the said runway table is constructed and arranged to be lighter in weight in its portion on the vehicle discharging side of the said pivot bearing than it is on the opposite side of said bearing, and the said detent notch opens upward out of the said fulcrum bracket head in a position to receive and to interlock with a projecting portion of the said toy load vehicle and hold the latter against rolling while positioned with its center of gravity on said vehicle discharging side of the pivot bearing.

8. A toy railway car for conveying a toy wheeled load vehicle along a toy railway track and rolling said vehicle off from said car downward to a trackside level, including the combination of, a toy car chassis having a side edge paralleling the rails of said track, a turn-tilt table carried by said chassis equipped with gangplank tracks supporting and guiding the wheels of said toy wheeled vehicle with the axis thereof extending crosswise of the car, swivel and hinge joints connecting said table to said chassis so cooperatively constructed and arranged that said hinge joint enables said table at times to be tilted about a horizontal axis relative to said chassis and said swivel joint enables said table together with said hinge joint to be swung about a vertical axis relative to said chassis to and away from a position wherein said horizontal axis is substantially at and parallel with one side edge of said chassis, and stop means constructed and arranged to arrest swiveling movement of said table when said hinge axis occupies its said position thereby to assure freedom for said table to tilt downward clear of said chassis to reach said trackside level.

9. A toy railway car for conveying a freight load along a toy railway track and chuting said load off from said car to the trackside level, including the combination of, a car chassis having a side edge paralleling the rails of said track, a turn-tilt chute-like dump-body carried by said chassis, swivel and hinge joints connecting said body to said chassis so cooperatively constructed and arranged that said hinge joint enables said body at times to be tilted about a horizontal axis relative to said chassis and said swivel joint enables said body together with said hinge joint to be swung about a vertical axis relative to said chassis to and away from a position wherein said horizontal axis is substantially at and parallel with one side edge of said chassis, and stop means constructed and arranged to arrest swiveling movement of said body when said hinge axis occupies its said position thereby to assure freedom for said body to tilt downward clear of said chassis and chute said load to said trackside level.

10. A toy conveyance for transporting a toy load and then chuting said load off from said conveyance to deliver it at a predetermined location on ground level beside the conveyance, including the combination of, a long and relatively narrow conveyance frame, a turn-tilt chute-like load receptacle carried on said frame comprising a table sufficiently long to reach from said frame to the ground level alignable lengthwise with said frame and connected thereto in a manner to be swiveled to a position crosswise of said frame about a vertical axis located nearer the side edge than the longitudinal center line of said frame, and a joint between said table and said frame enabling the former to be tiltable about a horizontal axis until one end thereof rests at said ground level when said table occupies its said swiveled position.

11. A toy conveyance for transporting a toy load and then chuting said load off from said conveyance to deliver it at a predetermined location on ground level beside the conveyance, including the combination of, a long and relatively narrow conveyance frame, a turn-tilt chute-like load receptacle carried on said frame comprising a table sufficiently long to reach from said frame to the ground level alignable lengthwise with said frame and connected thereto in a manner to be swiveled about a vertical axis located nearer the side edge than the longitudinal center line of said table to a position crosswise of said frame, and a joint between said table and said frame enabling the former to be tiltable about a horizontal axis until one end thereof rests at said ground level when said table occupies its said swiveled position.

12. A toy conveyance for transporting a toy load and then chuting said load off from said conveyance to deliver it at a predetermined location on ground level beside the conveyance, including the combination of, a long and relatively narrow conveyance frame, a turn-tilt chute-like load receptacle carried on said frame comprising a table sufficiently long to reach from said frame to the ground level alignable lengthwise with said frame and connected thereto in a manner to be swiveled to a position crosswise of said frame about a vertical axis located nearer to the side edge than to the longitudinal center line of either said frame or said table, and a joint between said table and said frame enabling the former to be tiltable about a horizontal axis until one end thereof rests at said ground level when said table occupies its said swiveled position.

13. A toy railway car for transporting a toy wheeled load vehicle along a toy track and discharging said vehicle at the side of said track, including the combination of, a car chassis, an elongated turn-tilt table carried by said chassis adapted to support said toy wheeled vehicle thereupon with the wheel axis of the vehicle extending crosswise of the car, and joint structure connecting said table to said chassis in a manner enabling the former to be turned relative to the latter about a vertical axis for disposing the wheel axis of said vehicle lengthwise of said car and also enabling said table to be tilted in relation to said chassis about a horizontal axis for causing said vehicle to roll off from the car at the side of the track, together with detent means constructed and arranged to engage with the said toy wheeled load vehicle to prevent it from rolling on the said table lengthwise of the car, said detent means being so cooperatively related to said table that tilting of the latter about said horizontal axis disengages said vehicle from said detent means.

14. A toy conveyance adapted to travel for carrying a toy load in stable riding position thereon and adapted on occasion to dump said load from said conveyance, including the combination with a conveyance frame, of an elongated receptacle adapted to serve as a stable rest for a toy load to be transported by said conveyance and dumped therefrom, joint affording structure movably connecting said load receptacle to said conveyance frame in such manner that the receptacle is turnable about a vertical axis from a normal riding position on said frame to a predumping position crosswise of and overhanging said frame and is also tiltable upon a horizontal axis from a relatively stable load-carrying position on said frame to a relatively inclined load dumping position, said receptacle being normally biased with respect to said horizontal axis to swing thereabout from its said load dumping position to its said load carrying position automatically when freed from said load, and means to locate a load on said receptacle in a position wherein the weight of the load counteracts and may overcome said biasing of the receptacle thereby to cause said receptacle to tilt and dump the load automatically when said receptacle occupies its said pre-dumping position.

15. A toy railway car comprising a wheeled chassis, said wheels being flanged for operation on a toy track, a toy vehicle having regular wheels for land operation, a vehicle runway on top of said chassis and dimensioned to receive and support the wheels of the wheeled vehicle, means to incline the runway for discharge of said vehicle therefrom, and an upwardly projecting member dimensioned to receive a part of said toy vehicle and thereby to prevent longitudinal movement of the vehicle on the runway when the runway is in horizontal position, said member being disengaged from the toy vehicle when the runway is moved to inclined position, thus permitting said vehicle to roll on its own wheels down the inclined runway.

16. The combination of, a toy railway car including a wheeled chassis adapted to roll on a toy track, a smaller toy vehicle transportable on said railway car, a vehicle carrying elongated table on said chassis having a vehicle discharging end, means to incline said table about an axis extending crosswise of said table intermediate its length so that said table end can be lowered to the track level for discharging said vehicle therefrom, a barrier constructed and arranged to restrain said vehicle against departure from said table in the direction of said end thereof when said table is in horizontal position, said table and barrier being cooperatively associated in a manner to render said barrier ineffective to restrain said vehicle when said table is inclined.

17. The combination of, a toy railway car including a wheeled chassis, a smaller toy vehicle transportable on said railway car, a vehicle carrying table on said chassis, means to incline said table for discharging said vehicle therefrom, an upwardly projecting member on said chassis shaped and arranged to engage a part of said vehicle in a manner to cause restraint of the latter against departure in at least one direction from said table when said table is in horizontal position, said table and member being so cooperatively shaped and arranged that said table may be inclined while said member remains stationary thereby to move said vehicle relatively to said stationary member in a direction to release said vehicle from restraint by said member.

18. The combination of, a toy railway car including an elongated wheeled chassis, a smaller elongated toy vehicle transportable on said railway car, an elongated vehicle runway on top of said chassis extending crosswise thereof, means to incline said runway in a plane crosswise of said chassis for discharging said vehicle therefrom, an upwardly projecting member on said chassis shaped and arranged to engage a part of said vehicle while the latter is longitudinally aligned with said runway in a manner to cause restraint of the vehicle against rolling lengthwise of said runway when said runway is in horizontal position, said runway and member being so shaped and cooperatively arranged that inclining said runway tilts said vehicle and simultaneously frees the latter from restraint by said member.

19. A toy railway car including a wheeled chassis whose wheels are flanged for operation on a toy track, a toy vehicle having regular wheels for land operation, a vehicle carrying table on top of said chassis, means to incline said table so that one end thereof is lowered to the level of said track at the side of the latter for discharging said vehicle from said table without overturning the former, a barrier movably anchored to said chassis and upstanding from the latter to engage a part of said vehicle in a manner to restrain the latter against departure from said table when the latter is in horizontal position, and common means operatively related to both said table and barrier in a manner to cause said end of said table to be lowered to said track level and to free said vehicle from restraint by said barrier.

20. A toy railway car for transporting and discharging therefrom a toy vehicle having at least two wheels and an axle extending therebetween, including the combination of, a car body including a platform structure, a detent member pivotally mounted on and upstanding from said platform structure containing a detent notch in its upper end portion, a pivotal bearing near one edge of said platform structure, and an elongated runway atop said car platform fulcrumed at said bearing and straddling and flanking said detent member in a manner to support said two vehicle wheels in such position and alignment that said vehicle axle is lodgeable in said detent notch.

21. The combination with a toy railway car chassis for transporting and discharging therefrom a toy vehicle, a table having pivotal support atop said car in a manner to be tiltable about a horizontal axis, detent means on said car constructed and arranged to block the path of said vehicle in at least one direction of vehicle departure from said table when the latter is in horizontal position, and motivating means on said chassis operable to cause said table to be tilted about said pivotal support in a manner to cause said vehicle to be lifted above and thereby freed from said detent means.

22. In a toy railway car for transporting and discharging therefrom a toy vehicle, a car chassis, a table pivotally supported atop said car chassis in a manner to be tiltable about a horizontal axis, detent means movably mounted on said chassis constructed and arranged to block the path of said vehicle in at least one direction of vehicle departure from said table when the latter is in horizontal position, and actuating means on said chassis operable to motivate said detent means relative to said chassis in a manner to cause said table to be tilted and said vehicle to be lifted above and freed from said detent means.

23. The combination with a toy railway car chassis for transporting and discharging therefrom a toy vehicle, a table pivotally supported atop said chassis in a manner to be tiltable about a horizontal axis, detent means movably mounted on said chassis constructed and arranged to block the path of said vehicle in at least one direction of vehicle departure from said table when the latter is in horizontal position, actuating means on said chassis for motivating said detent means and said table, and connections operatively associating said detent means said table and said actuating means constructed and arranged to enable said actuating means to shift said detent means and said table to positions in which the vehicle is lifted above and becomes freed from said detent means.

24. Toy freight delivering mechanism including in combination with a platform terminating at an edge elevated above its surroundings, a fulcrum base swiveled on said platform to turn relatively thereto about a vertical axis, an elongated table adapted to serve as a temporary rest for a toy freight load to be delivered from said platform, and a fulcrum joint connecting said turnable fulcrum base and table so that said table swings with the turning of said base between a position in which the load delivering end portion of the table overlies and rests level on said platform to a pre-dumping position in which said table end portion is deprived of support by said platform and the weight of the toy freight load resting thereupon can cause said table automatically to tilt about said fulcrum joint from its said pre-dumping position to a load dumping position thereby to dump said load, said table being biased with respect to said fulcrum joint to swing automatically thereabout from its load dumping position to its original level when freed from said load.

25. Toy freight delivering mechanism including in combination with a platform terminating at an edge elevated above its surroundings, a fulcrum base swiveled on said platform to turn relatively thereto about a vertical axis, an elongated table adapted to serve as a temporary rest for a toy freight load to be delivered from said platform, and a fulcrum joint connecting said turnable fulcrum base and table so that said table swings with the turning of said base between a position in which the load delivering end portion of the table overlies and rests level on said platform to a pre-dumping position in which said table end portion is deprived of support by said platform and the weight of the toy freight load resting thereupon can cause said table automatically to tilt about said fulcrum joint from its said pre-dumping position to a load dumping position thereby to dump said load, the weight of said table alone being so distributed that said load delivering end portion of the table is lighter in weight than portions of the table on the opposite side of said fulcrum joint whereby when relieved of the weight of said load the table automatically tilts back to its original level.

26. Toy freight delivering mechanism including in combination with a platform terminating at an edge elevated above its surroundings, a fulcrum bracket swiveled on said platform to turn relatively thereto about a vertical axis located near said edge of the platform, an elongated table adapted to serve as a temporary rest for a toy freight load to be delivered from said platform, and a fulcrum joint connecting said bracket and table so that said table swings with said bracket between a position in which the load delivering end portion of the table overlies and rests on said platform to a position in which said table end portion overhangs said edge of the platform, whereby said table end portion is deprived of support by said platform and the weight of the toy freight load resting thereupon can cause said table automatically to tilt about said fulcrum joint and dump said load, the weight of said table alone being so distributed that said load delivering end portion of the table is lighter in weight than portions of the table on the opposite side of said fulcrum joint whereby when relieved of the weight of said load the table automatically tilts back to its original level.

27. In a toy railway car for transporting a toy load object and causing the latter to swing about in a horizontal plane relative to the car, the combination of a car platform having an aperture, a turnable structure pivotally mounted on said platform including a turntable adapted to support the toy load object, a projection carried by said structure extending to below said platform through said aperture, and an electromagnetically operated actuator mounted beneath said platform in a manner to slide in a straight path of travel and constructed and arranged to impel said projection in an arc of travel for causing said structure to swing about its pivot relative to said platform.

28. In a toy railway car for transporting a toy load object and causing the latter to swing about in a horizontal plane relative to the car, the combination defined in claim 27, in which the said actuator includes a cam constructed and arranged to engage and impel said projection in an arc of travel while permitting relative sliding movement between said cam and said projection.

29. In a toy railway car for transporting a toy load object and causing the latter to swing into and become releasably locked in an objective position relative to the said car platform, the combination defined in claim 27, in which the said actuator includes a cam constructed and arranged to engage and impel said projection in an arc of travel extending partially crosswise the said straight path of actuator travel, said cam having a notch shaped and disposed to be found and entered by said projection while the latter is being impelled by the actuator and in a manner to lock said projection against movement relative to said cam without locking said cam against movement relative to said projection, thereby to establish and maintain the said turntable in the said objective position until subsequently impelled therefrom through reverse movement of said actuator.

RICHARD G. SMITH.